(12) United States Patent
Li et al.

(10) Patent No.: US 11,562,491 B2
(45) Date of Patent: Jan. 24, 2023

(54) AUTOMATIC PANCREAS CT SEGMENTATION METHOD BASED ON A SALIENCY-AWARE DENSELY CONNECTED DILATED CONVOLUTIONAL NEURAL NETWORK

(71) Applicant: ZHEJIANG LAB, Hangzhou (CN)

(72) Inventors: Jingsong Li, Hangzhou (CN); Peijun Hu, Hangzhou (CN); Yu Tian, Hangzhou (CN); Tianshu Zhou, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/541,271

(22) Filed: Dec. 3, 2021

(65) Prior Publication Data
US 2022/0092789 A1 Mar. 24, 2022

Related U.S. Application Data

(63) Continuation of application No. PCT/CN2021/073132, filed on Jan. 21, 2021.

(30) Foreign Application Priority Data

Apr. 9, 2020 (CN) .......................... 202010274508.6

(51) Int. Cl.
*G06T 7/11* (2017.01)
*G06V 10/82* (2022.01)
*G06N 3/08* (2006.01)

(52) U.S. Cl.
CPC ................ *G06T 7/11* (2017.01); *G06N 3/084* (2013.01); *G06V 10/82* (2022.01);
(Continued)

(58) Field of Classification Search
CPC ............ G06T 7/11; G06T 2207/20084; G06V 10/82
See application file for complete search history.

(56) References Cited

U.S. PATENT DOCUMENTS

| 2008/0215510 | A1* | 9/2008 | Regli ...................... G06T 19/00 706/12 |
| 2016/0163058 | A1* | 6/2016 | Wei ........................ G06V 10/25 382/171 |
| 2016/0239981 | A1* | 8/2016 | Tunali .................... G06V 10/50 |
| 2017/0337682 | A1* | 11/2017 | Liao ...................... G06T 7/0012 |

(Continued)

FOREIGN PATENT DOCUMENTS

| CN | 109447998 A | 3/2019 |
| CN | 109636817 A | 4/2019 |

(Continued)

OTHER PUBLICATIONS

L. Xie, Q. Yu, Y. Zhou, Y. Wang, E. K. Fishman and A. L. Yuille, "Recurrent Saliency Transformation Network for Tiny Target Segmentation in Abdominal CT Scans," in IEEE Transactions on Medical Imaging, vol. 39, No. 2, pp. 514-525, Feb. 2020 (Year: 2020).*

P. Hu et al., "Automatic Pancreas Segmentation in CT Images With Distance-Based Saliency-Aware DenseASPP Network," in IEEE Journal of Biomedical and Health Informatics, vol. 25, No. 5, pp. 1601-1611, May 2021 (Year: 2021).*

(Continued)

*Primary Examiner* — Gandhi Thirugnanam
(74) *Attorney, Agent, or Firm* — W&G Law Group (57) ABSTRACT

The present invention discloses an automatic pancreas CT segmentation method based on a saliency-aware densely connected dilated convolutional neural network. Under a coarse-to-fine two-step segmentation framework, the method uses a densely connected dilated convolutional (Continued)

neural network as a basis network architecture to obtain multi-scale image feature expression of the target. An initial segmentation probability map of the pancreas is predicted in the coarse segmentation stage. A saliency map is then calculated through saliency transformation based on a geodesic distance transformation. A saliency-aware module is introduced into the feature extraction layer of the densely connected dilated convolutional neural network, and the saliency-aware densely connected dilated convolutional neural network is constructed as the fine segmentation network model. A coarse segmentation model and the fine segmentation model are trained using a training set, respectively.

9 Claims, 3 Drawing Sheets

(52) U.S. Cl.
CPC .............. *G06T 2207/10081* (2013.01); *G06T 2207/20081* (2013.01); *G06T 2207/20084* (2013.01); *G06T 2207/20132* (2013.01); *G06T 2207/20221* (2013.01); *G06T 2207/30004* (2013.01)

(56) References Cited

U.S. PATENT DOCUMENTS

| | | | |
|---|---|---|---|
| 2017/0372162 A1* | 12/2017 | Wang | G06T 7/162 |
| 2019/0370965 A1* | 12/2019 | Lay | G16H 50/30 |
| 2020/0058126 A1* | 2/2020 | Wang | G06K 9/6262 |
| 2022/0092789 A1* | 3/2022 | Li | G06T 7/11 |

FOREIGN PATENT DOCUMENTS

| | | |
|---|---|---|
| CN | 110889852 A | 3/2020 |
| CN | 111640120 A | 9/2020 |
| EP | 2362350 A1 | 8/2011 |

OTHER PUBLICATIONS

International Search Report (PCT/CN2021/073132); dated Apr. 26, 2021.

* cited by examiner

AUTOMATIC PANCREAS CT SEGMENTATION METHOD BASED ON A SALIENCY-AWARE DENSELY CONNECTED DILATED CONVOLUTIONAL NEURAL NETWORK

CROSS-REFERENCE TO RELATED APPLICATIONS

The present application is a continuation of International Application No. PCT/CN2021/073132, filed on Jan. 21, 2021, which claims priority to Chinese Application No. 202010274508.6, filed on Apr. 9, 2020, the contents of both of which are incorporated herein by reference in their entireties.

TECHNICAL FIELD

The present invention belongs to a field of CT segmentation technology, and particularly relates to a pancreas CT automatic segmentation method based on a saliency densely connected dilated convolutional network.

BACKGROUND

In the diagnosis and prognosis prediction of pancreatic diseases, a necessary task is to identify and segment pancreatic regions from medical images (such as magnetic resonance Imaging (MR), computer tomography (CT)). Accurate segmentation of the pancreas can provide a variety of important biomarkers, such as volume, three-dimensional shape features, three-dimensional curved surface features, and so on. For example, pancreatic volume can provide assistance for evaluating endocrine and exocrine functions of the pancreas, and predicting the occurrence of pancreatic fistula after pancreaticoduodenectomy. However, it is time-consuming and labor-intensive to delineate the pancreas boundary from the three-dimensional images layer by layer, and it is variable under different operators and different operations. Therefore, the study of fast and robust pancreas automatic segmentation algorithm has important clinical significance and value.

Automatic Pancreas CT segmentation is a challenging task because: 1) the pancreas occupies a very small proportion of entire CT, resulting in a huge gap between the foreground and the background of the image segmentation task; 2) the pancreas shares the gray-scale texture distribution with surrounding organs and tissues, and the boundary is blurred or there is no visible boundary; 3) the pancreas has an irregular shape, and there are great differences in location and size. These characteristics make traditional segmentation algorithms based on image information (such as level set, graph cut, threshold method) not suitable for automatic pancreas segmentation.

In recent years, deep learning methods have made great breakthroughs in the task of pancreas segmentation. Existing methods generally adopt a two-step or iterative segmentation method from coarse to fine, that is, first a coarse segmentation network model is trained to predict an initial segmentation area of the pancreas. Then, a region of interest of the pancreas image is cropped by using the position information of the initial segmentation, to obtain smaller image blocks as the input of the fine segmentation network, and a fine segmentation network model is trained to obtain the final segmentation result of the pancreas. Although reducing the detection difficulty caused by the small pancreatic area, the method does not make full use of the initial segmentation information and only uses the position information. On the other hand, in the current pancreas segmentation methods based on deep learning, the more commonly used network models are end-to-end U-Net, DenseNet, ResNet, etc., without special consideration of the characteristics of variable size of the pancreas.

SUMMARY

The purpose of the present invention is aiming at the shortcomings of the existing coarse-to-fine two-step deep convolutional neural network pancreas CT segmentation method, and proposes a small target automatic segmentation model based on a saliency-aware densely connected dilated convolutional neural network to realize the accurate segmentation of pancreas from CT images.

The purpose of the present invention is achieved through the following technical solutions: the present invention uses a densely connected dilated convolutional neural network as the basic network architecture, and introduces a novel saliency-aware module based on a geodesic distance transformation into a network, and constructs a saliency-aware densely connected dilated convolutional neural network for precise segmentation of the pancreas. Under a coarse-to-fine two-step segmentation framework, the coarse segmentation information is converted into saliency information through the saliency-aware module and added to the feature extraction layer of the fine segmentation network. The coarse segmentation information is effectively used to guide the fine segmentation task and improve the final accuracy of pancreas segmentation. The constructed saliency-aware module does not have any assumptions about the basic network architecture and can be extended to other network structures. At the same time, the densely connected dilated convolutional neural network can obtain densely multi-scale feature expression, effectively overcome the difficulty of variable size of the pancreas, and improve the segmentation accuracy of the network model. The specific implementation steps of the present invention are as follows:

(1) preprocessing of the training set, including:

collecting CT volume data and making a standard pancreas segmentation result of the data;

denoting 3D CT volume as X, and slice number of the volume data is L; the corresponding standard segmentation is $Y=(y_j, j=1, \ldots, |X|), y_j=\{0,1\}$, wherein $|X|$ represents the number of all voxels in X, $y_j=1$ or $y_j=0$ represents that voxel j belongs to the pancreas or background, respectively;

Slicing each volume X into two-dimensional image slices alone axial view, and combining three consecutive images into a three-channel pseudo-color image, denoted as $X_{A,l}$ (l=1, ..., L);

Slicing Y into two-dimensional image slices alone axial view, and combining three consecutive label images into a three-channel label image, denoted as $Y_{A,l}$ (l=1, ..., L);

adjusting the contrast of each two-dimensional image $X_{A,l}$;

cropping each pair of two-dimensional images $X_{A,l}$ and $Y_{A,l}$ into fixed size image block as input of a coarse segmentation network;

(2) coarse segmentation stage, including:

constructing a deep convolutional neural network for coarse segmentation for pancreas CT, and training the network by training samples to obtain a pancreas initial segmentation model;

feeding the test image into the trained network model to assign each pixel in the image a probability value $P_{A,l}^C$ of belonging to the pancreas; binarizing the probability value to obtain an initial segmentation result $Z_I^C$ of the pancreas;

cropping the region of interest on the original input image according to the initial segmentation result, and denoting the cropped image as $X_{A,I}^F$; Similarly, cropping the label image and denoting it as $Y_{A,I}^F$;

(3) calculating a saliency map based on a geodesic distance, including:

calculating a geodesic distance map according to the original image $X_{A,I}^F$ and the initial segmentation result $Z_I^C$;

performing a saliency transformation on the geodesic distance map to obtain a saliency map $S(X_{A,I}^F)$;

(4) fine segmentation stage, including:

constructing a saliency-aware densely connected dilated convolutional neural network: adding a saliency-aware module after each dense block of the densely connected dilated convolutional neural network to introduce saliency information based on the geodesic distance map. Denoting $F(X_{A,I}^F)$ as a output feature map of the dense block, and taking the saliency map $S(X_{A,I}^F)$ as a weight map to act on the feature map:

$$L_c(X_{A,I}^F) = F_c(X_{A,I}^F) \otimes S(X_{A,I}^F),$$

wherein $c \in \{1, 2, \ldots, C\}$ is the index of feature map channel, and $\otimes$ represents element-wise multiplication;

combining the obtained $L_c(X_{A,I}^F)$ with the original feature map $F_c(X_{A,I}^F)$ through an identity transformation and a parameter $\eta$:

$$H_c(X_{A,I}^F) = F_c(X_{A,I}^F) \otimes \eta^* L_c(X_{A,I}^F),$$

where the symbol $\otimes$ represents element-wise addition, and the parameter $\eta$ is an adjustment coefficient, which is obtained through the network training. The output $H_c(X_{A,I}^F)$ of the obtained saliency-aware module is used as an input of next transition layer to participate in the calculation;

feeding the original image $X_{A,I}^F$ and the corresponding label image $Y_{A,I}^F$ into the constructed saliency-aware densely connected dilated convolutional neural network for parameter training, and obtaining the fine segmentation network model;

(5) fusing multi-layer two-dimensional pancreatic segmentation results to obtain a three-dimensional pancreatic segmentation result, for a test image $X^{test}$, slicing $X^{test}$ along axial view plane to obtain a two-dimensional image sequence, and combining three consecutive gray-scale images into a three-channel pseudo-color image $X_{A,I}^{test}$ (l=1, ..., L); feeding each image into the trained coarse segmentation model and the fine segmentation model successively, and obtaining a prediction result $P_{A,I}$ for each image about pancreas area;

performing multi-layer probability value fusion on the prediction result $P_{A,I}$, and a predicted segmentation result $Z_A(l)$ of the two-dimensional original image of each layer is the average value of predicted values of three pseudo-color images in this layer.

Further, wherein the adjusting the contrast of each two-dimensional image $X_{A,I}$, is specifically: the HU values of images are truncated into range [−100, 240], and then normalized to be in range [0, 1].

Further, in the coarse segmentation stage, the densely connected dilated convolutional neural network is configured to perform coarse segmentation on pancreas CT, and the network is composed of two parts:

the first part is a feature extraction layer consists of a densely connected network 161 (DenseNet161), including a convolution-normalization-ReLU activation-pooling layer, four dense blocks and four transition layers. The number of feature maps obtained from the first dense block is 96, and a subsequent growth rate is 48; the size of the output feature maps of the feature extraction layer is of ⅛ input image size;

the second part is three densely connected dilated convolutional layers (atrous convolutional layer), dilation rates are 3, 6 and 12, respectively. The input of each dilated convolutional layer is the output of all previous dilated convolutional layers;

in the end of the network is an upper sampling layer with an upper sampling rate of 8 and a classification layer to predict the probability of belonging to pancreas region for each pixel in the image;

the loss function of the network is set as:

$$E = -\frac{1}{n}\sum_{j=1}^{n}\sum_{c \in \{0,1\}} 1(y_j = c)\log p(z_j = c)$$

where, n is the number of pixels in the input image, $y_j$ and $z_j$ are true label and predicted label of pixel j, respectively, and c=1 or 0 represents foreground or background, respectively. The function 1(·) is an characteristic function, and p(·) is a probability function predicted by the network model.

Further, in the coarse segmentation stage, feeding prepared training set into the densely connected dilated convolutional neural network, and obtaining network parameters by the back-propagation algorithm.

Further, the geodesic distance map $G(S_f, X_{A,I}^F)$ is calculated as follows:

denoting sets of pixels belonging to the pancreas area and the background as $S_f$ and $S_g$, respectively according to the initial segmentation $Z_I^C$. The geodesic distance $G^0(i, S_f, X_{A,I}^F)$ from pixel i to $S_f$ is defined as:

$$G^0(i, S_f, X_{A,I}^F) = \min_{j \in S_f} D_{geo}(i, j, X_{A,I}^F),$$

$$D_{geo}(i, j, X_{A,I}^F) = \min_{p \in \mathcal{P}(i,j)} \int_0^1 \|\nabla X_{A,I}^F(p(s)) \cdot u(s)\| ds,$$

where $\mathcal{P}(i,j)$ is a set of all feasible paths from pixel i to j; path p is parameterized by $s \in [0,1]$ as p(s);

$$u(s) = \frac{p(s)'}{\|p(s)'\|}$$

is a unit vector that is tangent to the path direction, and p(s)' represents derivation for s. The image derivative $\nabla X_{A,I}^F(p(s))$ requires the path from i to j to be the shortest in terms of image gray-scale similarity. The symbol $\int_0^1 ds$ represents an integral from 0 to 1, the symbol $\|\ \|$ represents $l_1$ norm, and the symbol represents belongs to;

denoting the geodesic distance map as $G(S_f, X_{A,I}^F)$, and the calculation is as follows:

$$G(i, S_f, X_{A,I}^F) = 1 - \frac{G^0(i, S_f, X_{A,I}^F)}{\max_i G^0(i, S_f, X_{A,I}^F)}$$

where i is a pixel in the geodesic distance map.

Further, the saliency map $S(X_{A,l}^F)$ is calculated as follows:

$$S(X_{A,l}^F)=r(G(S_f,X_{A,l}^F))$$

where $r(\cdot)$ is a size-preserved saliency transformation that uses one 3×3 convolutional layer.

Further, in step (5), the predicted segmentation result $Z_A(l)$ of the two-dimensional original image of each layer is calculated as follows:

$$Z_A(l)=\tfrac{1}{3}(P_{A,l-1}(3)+P_{A,l}(2)+P_{A,l+1}(1)),$$

where $P_{A,l}(i), i=1, 2, 3$ respectively represent the $P_{A,l}$ value of $i^{th}$ channel.

The present application also proposes a pancreas CT automatic segmentation system based on a saliency-aware densely connected dilated convolutional neural network, including:

a memory for storing computer executable instructions; and a processor for realizing the steps in the above method when executing the computer executable instructions.

The present application also proposes a computer-readable storage medium having stored therein computer executable instructions which, when executed by a processor, implement the steps in the above method.

The beneficial effects of the present invention are: the present invention is based on a coarse-to-fine two-step segmentation framework, and uses a densely connected dilated convolutional neural network as the basic network architecture for pancreas segmentation tasks, which can solve the difficulty in detection and segmentation of pancreas under conditions of variable sizes and positions. At the same time, the saliency-aware module based on a geodesic distance transformation is innovatively introduced into the densely connected dilated convolutional neural network, and the coarse segmentation result is effectively converted into saliency information and added to the feature representation layer of the fine segmentation network model to improve the accuracy of the pancreas segmentation. The proposed saliency-aware module has good scalability and can be transplanted to other deep convolutional network structures.

DESCRIPTION OF EMBODIMENTS

To make the objectives, technical solutions and advantages of the present invention more comprehensible, embodiments of the present invention is described in further detail below with reference to the accompanying drawings.

Many specific details are described in the following description to facilitate a full understanding of the present invention, but the present invention can also be implemented in other ways different from those described here. Those skilled in the art can make similar promotion without violating the connotation of the present invention. Therefore, the present invention is not limited by the specific embodiments disclosed below.

The dilated convolution of the present application is: holes are injected into a standard convolution kernel to increase the reception field of a model. HU value: that is, CT value, which is a measurement unit for measuring a density of a local tissue or organ of the human body, and it is usually called Hounsfield unit (HU), for example, air is −1000 and dense bone is +1000.

Figure 1:
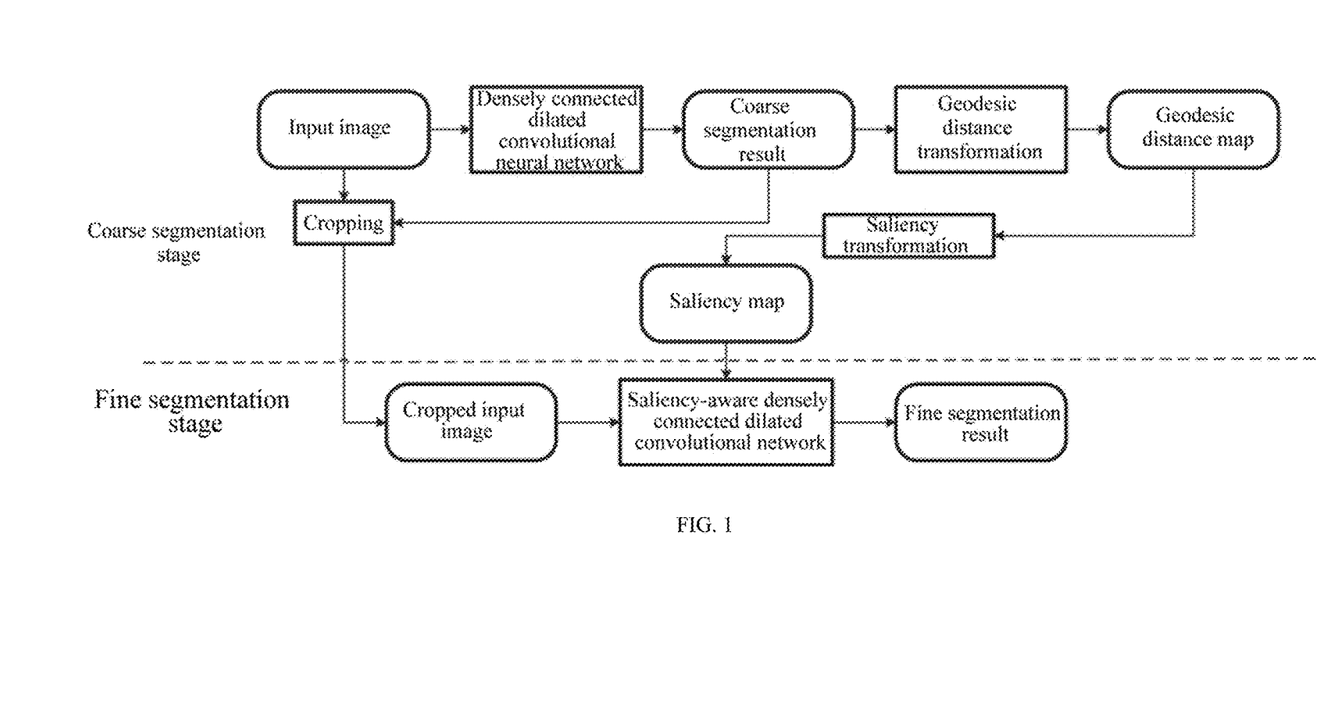
FIG. 1 is a flow chart of pancreas segmentation based on a saliency-aware densely connected dilated convolutional neural network according to the present invention.
Figure 2:
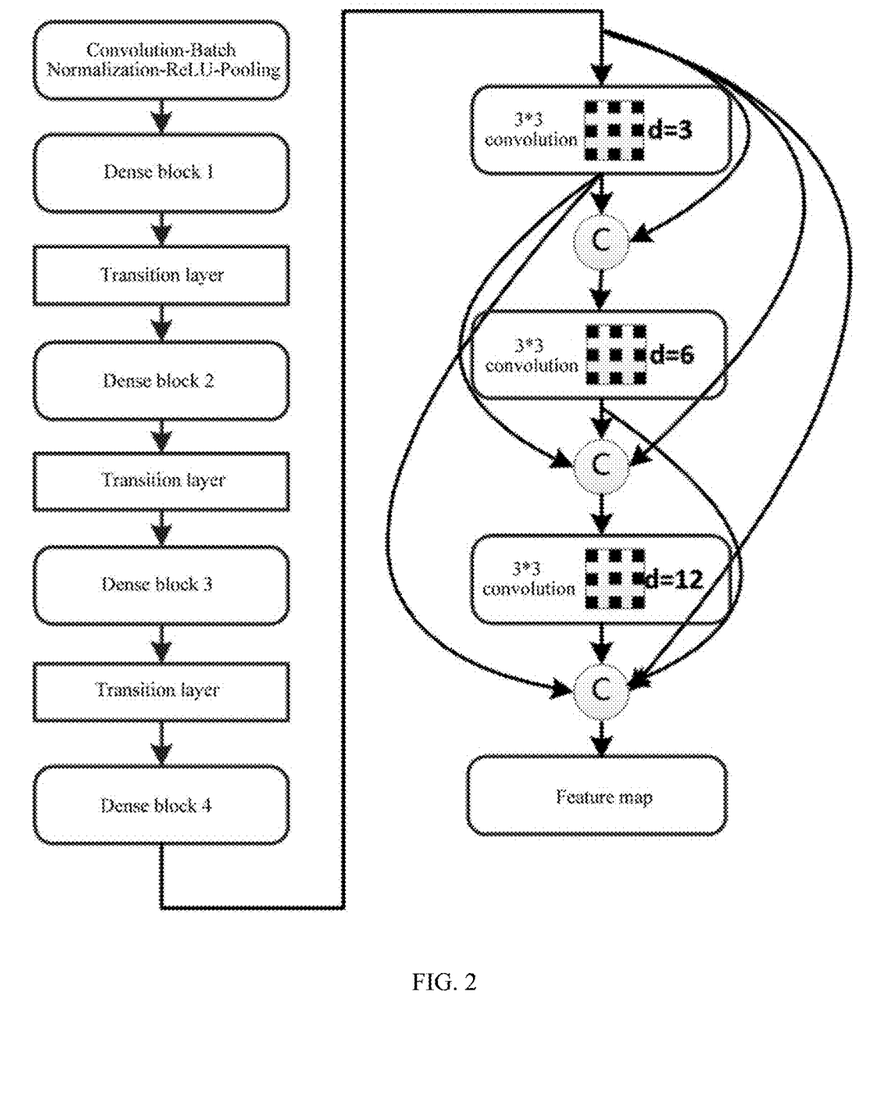
FIG. 2 is the architecture diagram of the densely connected dilated convolutional neural network.

A coarse-to-fine two-step segmentation process based on a saliency-aware densely connected dilated convolutional neural network proposed in the present application is shown in FIG. 1. The process is as follows: in the coarse segmentation stage, firstly, a densely connected dilated convolutional neural network (as shown in FIG. 2) is constructed for coarse segmentation of pancreatic region from three-dimensional pancreas CT volume, and geodesic distance transformation and saliency transformation are performed on the coarse segmentation result to obtain a saliency map. At the same time, the coarse segmentation result is used to crop a region of interest of input original image, and a cropped image is used as an input of the fine segmentation model. In the fine segmentation stage, a saliency-aware densely connected dilated convolutional neural network model is constructed. The model uses the original image and saliency information calculated from the coarse segmented pancreatic region for training and predicting, to realize accurate segmentation of the pancreas. The specific steps are as follows:

(1) preprocessing of the training set (1.1) collecting CT volume data and making a standard pancreas segmentation result of the data; denoting 3D CT volume as X, whose size is 512×512×L, where L is the slice number of the volume data; the corresponding standard segmentation is $Y=(y_j, j=1, \ldots, |X|), y_j=\{0,1\}$, where $|X|$ represents the number of all voxels in X, $y_j=1$ or $y_j=0$ represents that voxel j belongs to the pancreas or background, respectively; slicing each volume X into two-dimensional image slices alone axial view and combining three consecutive images into a three-channel pseudo-color image, denoting as $X_{A,l}(l=1, \ldots, L)$; similarly, slicing Y into two-dimensional image slices alone axial view, and combining three consecutive label images into a three-channel label image, denoting as $Y_{A,l}(l=1, \ldots, L)$;

(1.2) adjusting the contrast of each two-dimensional image $X_{A,l}$. Specifically, the HU values of images are truncated into range [−100, 240], and then normalized to be in range [0, 1].

(1.3) cropping each pair of two-dimensional images $X_{A,l}$ and $Y_{A,l}$ into image block with size of 448×448, and take it as input of the coarse segmentation network.

(2) The densely connected dilated convolutional neural network is configured to perform coarse segmentation on pancreas CT (2.1) constructing a densely connected dilated convolutional neural network (as shown in FIG. 2), and the network is composed of two parts. First, a feature extraction layer of a densely connected network 161 (DenseNet161) is used as the first part, which includes a convolution-normalization-ReLU activation-pooling layer, four dense blocks and four transition layers; the number of featuremaps obtained from the first dense block is 96, and a subsequent growth rate is 48; the size of the output feature maps of the feature extraction layer is of ⅛ input image size, that is 56×56; the second part of the densely connected dilated convolutional neural network is three densely connected dilated convolutional layers, of which the dilation rates are 3, 6 and 12 respectively; the input of each dilated convolutional layer is the output of all previous dilated convolutional layers; the feature map size of final output of the densely connected dilated convolutional network is 56×56.

In the end of the network is an upper sampling layer with an upper sampling rate of 8 and a classification layer to predict the probability of belonging to pancreas region for each pixel in the image; the loss function of the network is set as:

$$E = -\frac{1}{n}\sum_{j=1}^{n}\sum_{c\in\{0,1\}} I(y_j = c)\log p(z_j = c)$$

where n is the number of pixels in the input image, $y_j$ and $z_j$ are true label and predicted label of pixel j, respectively, and c=1 or 0 represents the foreground or the background, respectively. The function $1(\cdot)$ is a characteristic function, the function log is a logarithmic function, and $p(\cdot)$ is a probability function predicted by the network model. The symbol $\Sigma$ is a summation symbol, and the symbol E represents belonging.

(2.2) training parameters of the densely connected dilated neural convolutional network with the training set samples; feeding a prepared training set into the network, and obtaining network parameters by the back-propagation algorithm; obtaining a pancreas coarse segmentation model after training.

(2.3) feeding the test image into the trained network model to assign the probability value $P_{A,l}^C$ belonging to the pancreas for each pixel in the image; binarizing the probability value to obtain an initial segmentation result $Z_l^C$ of the pancreas, where the binarization threshold is set to be 0.5.

(2.4) cropping a region of interest on the original input image according to the initial segmentation result. Specifically, a bounding box of $Z_l^C$ is calculated, and the bounding box is padded by m, the m is set to 20 pixels. According to the bounding box, the original image is cropped and denoted as $X_{A,l}^F$. Similarly, the original label image is cropped and denoted as $Y_{A,l}^F$.

(3) calculating a saliency map based on geodesic distance (3.1) calculating a geodesic distance map with the original image $X_{A,l}^F$ and the initial segmentation result $Z_l^C$; denoting sets of pixels belonging to the pancreas area and the background as $S_f$ and $S_g$, respectively according to the initial segmentation $Z_l^C$; the geodesic distance $G^0(i,S_f,X_{A,l}^F)$ from pixel i to $S_f$ is defined as:

$$G^0(i, S_f, X_{A,l}^F) = \min_{j\in S_f} D_{geo}(i, j, X_{A,l}^F),$$

$$D_{geo}(i, j, X_{A,l}^F) = \min_{p\in \mathcal{P}(i,j)} \int_0^1 \|\nabla X_{A,l}^F(p(s))\cdot u(s)\| ds,$$

wherein $\mathcal{P}(i,j)$ is a set of all feasible paths from pixel i to j; path p is parameterized by $s\in[0,1]$ as $p(s)$;

$$u(s) = \frac{p(s)'}{\|p(s)'\|}$$

is a unit vector that is tangent to the the path direction, and $p(s)'$ represents derivation for s; the image derivative $\nabla X_{A,l}^F(p(s))$ requires the path from i to j to be the shortest in terms of image gray-scale similarity; the symbol $\int_0^1 ds$ represents an integral of s from 0 to 1, the symbol $\|\ \|$ represents the $l_1$ norm, and the symbol $\in$ represents belonging to.

We set the geodesic distance map as $G(S_f, X_{A,l}^F)$, and the calculation is as follows:

$$G(i, S_f, X_{A,l}^F) = 1 - \frac{G^0(i, S_f, X_{A,l}^F)}{\max_i G^0(i, S_f, X_{A,l}^F)}$$

where i is a pixel in the geodesic distance map.

(3.2) performing saliency transformation on the geodesic distance map to obtain a saliency map $S(X_{A,l}^F)$:

$$S(X_{A,l}^F)=r(G(S_f,X_{A,l}^F))$$

where $r(\cdot)$ is a size-preserved saliency transformation that uses one 3×3 convolutional layer.

(4) performing the fine segmentation on the pancreas CT by a saliency-aware densely connected dilated convolutional neural network (4.1) introducing a saliency-aware module into the densely connected dilated convolutional neural network to construct the saliency-aware densely connected dilated convolutional neural network; adding the saliency-aware module after each dense block of the densely connected dilated convolutional neural network constructed by step (2) to introduce saliency information based on the geodesic distance map; specifically, denoting $F(X_{A,l}^F)$ as a output feature map of the dense block, and taking the saliency map $S(X_{A,l}^F)$ as a weight map to act on the feature map:

$$L_c(X_{A,l}^F)=F_c(X_{A,l}^F)\lfloor S(X_{A,l}^F),$$

where $c\in\{1, 2, \ldots, C\}$ is the index of a feature map channel, and $\lfloor$ represents element-wise multiplication; further, combining the obtained $L_c(X_{A,l}^F)$ with the original feature map $F_c(X_{A,l}^F)$ through an identity transformation and a parameter $\eta$:

$$H_c(X_{A,l}^F)=F_c(X_{A,l}^F)\lfloor \eta*L_c(X_{A,l}^F),$$

where the symbol $\lfloor$ represents element-wise addition, and the parameter $\eta$ is an adjustment coefficient, which can be obtained through network training; the output $H_c(X_{A,l}^F)$ of the obtained saliency-aware module is used as an input of a next transition layer to participate in calculation.

(4.2) feeding the original image $X_{A,l}^F$ and the corresponding label image $Y_{A,l}^F$ into the constructed saliency-aware densely connected dilated convolutional neural network for parameter training, and obtaining a fine segmentation network model.

(5) fusing multi-layer two-dimensional pancreatic segmentation results to obtain a three-dimensional pancreatic segmentation result (5.1) for a test image $X^{test}$, slicing $X^{test}$ along axial view to obtain a two-dimensional image sequence, and combining three consecutive gray-scale images into a three-channel pseudo-color image $X_{A,l}^F$(l=1, . . . , L); feeding each image into the trained coarse segmentation model and the fine segmentation model successively, and obtaining a prediction result $P_{A,l}$ for each image about pancreas areas. $P_{A,l}$ is a three-channel image, and its first, second and third channels correspond to the probability values of the pancreas at the l=1, and l+1slices of the original CT volume, respectively.

(5.1) performing multi-layer probability value fusion on the prediction result $P_{A,l}$, and a predicted segmentation result $Z_A(l)$ of each two-dimensional original image is an average value of predicted values of three pseudo-color images in this layer, that is:

$$Z_A(l)=\tfrac{1}{3}(P_{A,l-1}(3)+P_{A,l}(2)+P_{A,l+1}(1)),$$

wherein, $P_{A,l}(i)$, i=1, 2, 3 represent the value of an $i^{th}$ channel of $P_{A,l}$, respectively We tested our model on 82 pancreatic CT data. All data is divided into four parts with cross-validation method, numbered 1, 2, 3, and 4. In the first experiment, numbers 2, 3, 4 are for training, 1 is for testing. In the second experiment, 1, 3, 4 are for training, 2 is for testing, and so on. Finally, the accuracy of the four sets of experiments is averaged. Experiments show that the fine segmentation accuracy using the DenseNet161 network model is 82.83%, the segmentation accuracy using the densely connected dilated convolutional neural network model is 83.88%, and the accuracy using the saliency-aware densely connected dilated convolutional neural network model of the present invention is 85.31%. This shows that the densely connected dilated convolutional network and the saliency-aware module used and proposed in the present invention can effectively improve the pancreatic segmentation accuracy.

Figure 3:
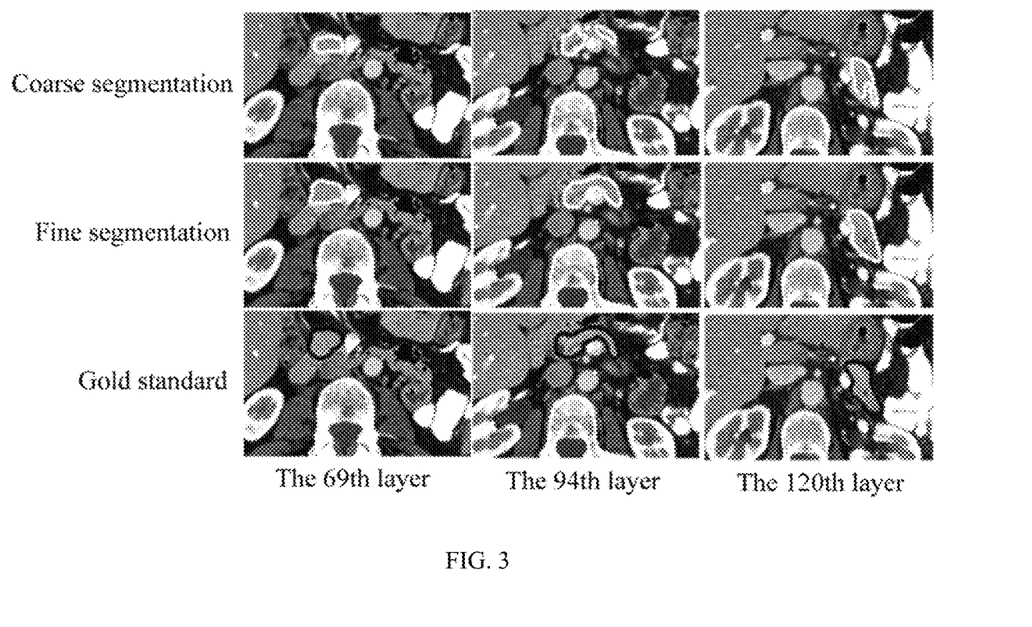
FIG. 3 is an embodiment of segmentation of the present invention.

FIG. 3 shows the segmentation results of our proposed saliency-aware densely connected dilated convolutional neural network model on different layers of one CT volume. The white contours are the algorithmic segmentation results, and the black contours are the gold standard. The coarse segmentation accuracy is 80.27%, and the fine segmentation accuracy is 85.23%.

The inventive point of the present invention is: the present invention uses densely connected dilated convolutional neural network to segment the pancreas CT to obtain a densely multi-scale feature representation of the pancreas; based on the geodesic distance transformation and the single-layer convolutional layer transformation, the saliency transformation is performed on the initial segmentation result to obtain the saliency information about the pancreas; the saliency-aware module is introduced to the densely connected dilated network, and the saliency-aware densely connected dilated convolutional neural network is constructed, so that the network obtains the saliency information about the pancreatic region in the feature extraction stage.

The above are only the preferred embodiments of the present invention. Although the present invention has been disclosed as above in preferred embodiments, it is not intended to limit the present invention. Anyone familiar with the art, without departing from the scope of the technical solution of the present invention, can use the methods and technical content disclosed above to make many possible changes and modifications to the technical solution of the present invention, or modify it modified into an equivalent embodiment with equivalent changes. For example, the densely connected dilated convolutional neural network in the present invention can also be replaced with other deep convolutional neural network models, such as U-net, DenseNet, ResNet and so on. The replacement of the network models does not affect the introduction of the saliency-aware module. The technical solution of the present invention is used for pancreas CT data, the imaging modality can also be replaced with other imaging data such as magnetic resonance imaging (MRI), and the segmented target pancreas can be replaced with other relative small organs or tissues such as the gallbladder. Therefore, all simple modifications, equivalent changes and modifications made to the above embodiments based on the technical essence of the present invention without departing from the technical solution of the present invention still fall within the protection scope of the technical solution of the present invention.

What is claimed is:

1. A pancreas CT automatic segmentation method based on a saliency-aware densely connected dilated convolutional neural network, comprising the following steps of:

(1) preprocessing of training set, comprising the following steps of:

collecting CT volume data and making a standard pancreas segmentation result of the data;

denoting 3D CT volume data as X, and slice number of the volume data as L, a corresponding standard segmentation $Y=(y_j, j=1, \ldots, |X|), y_j=\{0,1\}$, where $|X|$ represents the number of all voxels in X, $y_j=1$ or $y_j=0$ represents that voxel j belongs to the pancreas or a background, respectively;

Slicing each volume X into two-dimensional image slices alone axial view; and combining three consecutive images into a three-channel pseudo-color image, denoted as $X_{A,l}(l=1, \ldots, L)$;

Slicing Y into two-dimensional image slices alone axial view, and combining three consecutive label images into a three-channel label image, denoted as $Y_{A,l}(l=1, \ldots, L)$;

adjusting the contrast of each two-dimensional image $X_{A,l}$;

cropping each pair of two-dimensional images $X_{A,l}$ and $Y_{A,l}$ into fixed size image block as input of a coarse segmentation network;

(2) coarse segmentation stage, comprising the following steps of:

constructing a deep convolutional neural network for coarse segmentation for pancreas CT, and training the network by training samples to obtain a pancreas initial segmentation model;

feeding the test image into the trained network model to assign each pixel in the image a probability value $P_{A,l}^C$ of belonging to the pancreas; binarizing the probability value to obtain an initial segmentation result $Z_l^C$ of the pancreas;

cropping the region of interest on the original input image according to the initial segmentation result, and denoting the cropped image as $X_{A,l}^F$; Similarly, cropping the label image and denoting it as $Y_{A,l}^F$;

(3) calculating a saliency map based on a geodesic distance, comprising:

calculating a geodesic distance map according to the original image $X_{A,l}^F$ and the initial segmentation result $Z_l^C$;

performing a saliency transformation on the geodesic distance map to obtain a saliency map $S(X_{A,l}^F)$;

(4) fine segmentation stage, comprising the following steps of:

constructing a saliency-aware densely connected dilated convolutional neural network: adding a saliency-aware module after each dense block of the densely connected dilated convolutional neural network to introduce saliency information based on the geodesic distance map; denoting $F(X_{A,l}^F)$ as a output feature map of the dense block, and taking the saliency map $S(X_{A,l}^F)$ as a weight map to act on the feature map:

$$L_c(X_{A,l}^F) = F_c(X_{A,l}^F) \otimes S(X_{A,l}^F),$$

wherein $c \in \{1, 2, \ldots, C\}$ is the index of feature map channel, and $\otimes$ represents element-wise multiplication; combining the obtained $L_c(X_{A,l}^F)$ with the original feature map $F_c(X_{A,l}^F)$ through an identity transformation and a parameter $\eta$:

$$H_c(X_{A,l}^F) = F_c(X_{A,l}^F) \otimes \eta * L_c(X_{A,l}^F),$$

where the symbol ⊗ represents element-wise addition, and the parameter η is an adjustment coefficient, which is obtained through the network training; the output $H_c(X_{A,l}^F)$ of the obtained saliency-aware module is used as an input of next transition layer to participate in the calculation;

feeding the original image $X_{A,l}^F$ and the corresponding label image $Y_{A,l}^F$ into the constructed saliency-aware densely connected dilated convolutional neural network for parameter training, and obtaining the fine segmentation network model;

(5) fusing multi-layer two-dimensional pancreatic segmentation results to obtain a three-dimensional pancreatic segmentation result, for a test image $X^{test}$, slicing $X^{test}$ along axial view plane to obtain a two-dimensional image sequence, and combining three consecutive gray-scale images into a three-channel pseudo-color image $X_{A,l}^{test}$(l=1, . . . , L);

feeding each image into the trained coarse segmentation model and the fine segmentation model successively, and obtaining a prediction result $P_{A,l}$ for each image about pancreas area;

performing multi-layer probability value fusion on the prediction result $P_{A,l}$, and a predicted segmentation result $Z_A(l)$ of the two-dimensional original image of each layer is the average value of predicted values of three pseudo-color images in this layer.

2. The automatic pancreas CT segmentation method based on a saliency-aware densely connected dilated convolutional neural network according to claim 1, where the step of adjusting the contrast of each two-dimensional image $X_{A,l}$ is specifically: the HU values of images are truncated into range 00, 240], and then normalized to be in range [0, 1].

3. The automatic pancreas CT segmentation method based on a saliency-aware densely connected dilated convolutional neural network according to claim 1, wherein in the coarse segmentation stage, the densely connected dilated convolutional network is configured to perform coarse segmentation on pancreas CT, and the network is composed of two parts:

a first part is a feature extraction layer of a densely connected network 161, comprising a convolution-normalization-ReLU activation-pooling layer, four dense blocks and four transition layers; the number of feature maps obtained from a first dense block is 96, and a subsequent growth rate is 48; the size of the output feature map of the feature extraction layer is of ⅛ input image size;

a second part is three densely connected dilated convolutional layers, dilation rate are 3, 6 and 12, respectively; and an input of each dilated convolutional layer is the output of all previous dilated convolutional layers;

in the end of the network is a network connects an upper sampling layer with an upper sampling rate of 8 and a classification layer to predict the probability of belonging to pancreas region for each pixel in the image;

the loss function of the network is set as:

$$E = -\frac{1}{n}\sum_{j=1}^{n}\sum_{c \in \{0,1\}} l(y_j = c)\log p(z_j = c)$$

where, n is the number of pixels in the input image, $y_j$ and $z_j$ are true label and predicted label of pixel j, respectively, and c=1 or 0 represents foreground or the background, respectively, the function 1(·) is an characteristic function, and p(·) is a probability function predicted by the network model.

4. The automatic pancreas CT segmentation method based on a saliency-aware densely connected dilated convolutional neural network according to claim 3, where in the coarse segmentation stage, feeding a prepared training set into the densely connected dilated convolutional neural network, and obtaining network parameters by the back-propagation algorithm.

5. The automatic pancreas CT segmentation method based on a saliency—aware densely connected dilated convolutional neural network according to claim 1, where the geodesic distance map $G(S_f, X_{A,l}^F)$ is specifically calculated as follows:

denoting sets of pixels belonging to the pancreas area and the background as $S_f$ and $S_g$, respectively with initial segmentation $Z_l^C$; the geodesic distance $G^0(i, S_f, X_{A,l}^F)$ from pixel i to $S_f$ is defined as:

$$G^0(i, S_f, X_{A,l}^F) = \min_{j \in S_f} D_{geo}(i, j, X_{A,l}^F),$$

$$D_{geo}(i, j, X_{A,l}^F) = \min_{p \in \mathcal{P}(i,j)} \int_0^1 \|\nabla X_{A,l}^F(p(s)) \cdot u(s)\| ds,$$

where $\mathcal{P}(i,j)$ is a set of all feasible paths from pixel i to j; path p is parameterized by $s \in [0,1]$ as p(s);

$$u(s) = \frac{p(s)'}{\|p(s)'\|}$$

is a unit vector that is tangent to the path direction, and p(s)' represents derivation for s; an image derivative $\nabla X_{A,l}^F(p(s))$ requires the path from i to j to be the shortest in terms of image gray-scale similarity;

denoting the geodesic distance map as $G(S_f, X_{A,l}^F)$, and the calculation is as follows:

$$G(i, S_f, X_{A,l}^F) = 1 - \frac{G^0(i, S_f, X_{A,l}^F)}{\max_i G^0(i, S_f, X_{A,l}^F)}$$

where i is a pixel in the geodesic distance map.

6. The automatic pancreas CT segmentation method based on a saliency-aware densely connected dilated convolutional neural network according to claim 5, where the saliency map $S(X_{A,l}^F)$ is calculated as follows:

$$S(X_{A,l}^F) = r(G(S_f, X_{A,l}^F))$$

where r(·) is a size-preserved saliency transformation that uses one 3×3 convolutional layer.

7. The automatic pancreas CT automatic segmentation method based on a saliency-aware densely connected dilated convolutional neural network according to claim 1, where in step (5), the predicted segmentation result $Z_A(l)$ of the two-dimensional original image of each layer is calculated as follows:

$$Z_A(l) = \frac{1}{3}(P_{A,l-1}(3) + P_{A,l}(2) + P_{A,l+1}(1)),$$

where $P_{A,l}(i)$, i=1, 2, 3 represent $P_{A,l}$ value of an $i^{th}$ channel, respectively.

8. An automatic pancreas CT segmentation system based on a saliency-aware densely connected dilated convolutional neural network, comprising:

a memory storing computer executable instructions; and
a processor coupled to the memory and configured to execute the instructions:
(1) preprocessing of training set, comprising the following steps of:
collecting CT volume data and making a standard pancreas segmentation result of the data;
denoting 3D CT volume data as X, and slice number of the volume data as L, a corresponding standard segmentation being $Y-(y_j, j-1, \ldots, |X|), y_j-\{0,1\}$, where $|X|$ represents the number of all voxels in X, $y_j=1$ or $y_j=0$ represents that voxel j belongs to the pancreas or a background, respectively;
Slicing each volume X into two-dimensional image slices alone axial view; and combining three consecutive images into a three-channel pseudo-color image, denoted as $X_{A,l}(l=1, \ldots, L)$;
Slicing Y into two-dimensional image slices alone axial view, and combining three consecutive label images into a three-channel label image, denoted as $Y_{A,l}(l=1, \ldots, L)$;
adjusting the contrast of each two-dimensional image $X_{A,l}$;
cropping each pair of two-dimensional images $X_{A,l}$ and $Y_{A,l}$ into fixed size image block as input of a coarse segmentation network;
(2) coarse segmentation stage, comprising the following steps of:
constructing a deep convolutional neural network for coarse segmentation for pancreas CT, and training the network by training samples to obtain a pancreas initial segmentation model;
feeding the test image into the trained network model to assign each pixel in the image a probability value $P_{A,l}^C$ of belonging to the pancreas; binarizing the probability value to obtain an initial segmentation result $Z_l^C$ of the pancreas;
cropping the region of interest on the original input image according to the initial segmentation result, and denoting the cropped image as $X_{A,l}^F$; Similarly, cropping the label image and denoting it as $Y_{A,l}^F$;
(3) calculating a saliency map based on a geodesic distance, comprising:
calculating a geodesic distance map according to the original image $X_{A,l}^F$ and the initial segmentation result $Z_l^C$;
performing a saliency transformation on the geodesic distance map to obtain a saliency map $S(X_{A,l}^F)$;
(4) fine segmentation stage, comprising the following steps of:

constructing a saliency-aware densely connected dilated convolutional neural network: adding a saliency-aware module after each dense block of the densely connected dilated convolutional neural network to introduce saliency information based on the geodesic distance map; denoting $F(X_{A,l}^F)$ as a output feature map of the dense block, and taking the saliency map $S(X_{A,l}^F)$ as a weight map to act on the feature map:

$$L_c(X_{A,l}^F)=F_c(X_{A,l}^F) \otimes S(X_{A,l}^F),$$

wherein $c \in \{1, 2, \ldots, C\}$ is the index of feature map channel, and $\otimes$ represents element-wise multiplication;
combining the obtained $L_c(X_{A,l}^F)$ with the original feature map $F_c(X_{A,l}^F)$ through an identity transformation and a parameter $\eta$:

$$H_c(X_{A,l}^F)=F_c(X_{A,l}^F) \otimes \eta * L_c(X_{A,l}^F),$$

where the symbol $\otimes$ represents element-wise addition, and the parameter $\eta$ is an adjustment coefficient, which is obtained through the network training; the output $H_c(X_{A,l}^F)$ of the obtained saliency-aware module is used as an input of next transition layer to participate in the calculation;
feeding the original image $X_{A,l}^F$ and the corresponding label image $Y_{A,l}^F$ into the constructed saliency-aware densely connected dilated convolutional neural network for parameter training, and obtaining the fine segmentation network model;
(5) fusing multi-layer two-dimensional pancreatic segmentation results to obtain a three-dimensional pancreatic segmentation result,
for a test image $X^{test}$, slicing $X^{test}$ along axial view plane to obtain a two-dimensional image sequence, and combining three consecutive gray-scale images into a three-channel pseudo-color image $X_{A,l}^{test}(l=1, \ldots, L)$;
feeding each image into the trained coarse segmentation model and the fine segmentation model successively, and obtaining a prediction result $P_{A,l}$ for each image about pancreas area;
performing multi-layer probability value fusion on the prediction result $P_{A,l}$, and a predicted segmentation result $Z_A(l)$ of the two-dimensional original image of each layer is the average value of predicted values of three pseudo-color images in this layer.

9. A non-transitory computer-readable storage medium having stored therein computer executable instructions which implement the steps in the method of claim 1 when executed by a processor.

* * * * *